United States Patent [19]
Tabuchi

[11] Patent Number: 5,963,390
[45] Date of Patent: Oct. 5, 1999

[54] DIGITAL SERVO SYSTEM HAVING A SERVO LOOP, A DIGITAL FILTER INCLUDING COEFFICIENT MULTIPLYING MEANS, AND COEFFICIENT CHANGING MEANS

[75] Inventor: Junichiro Tabuchi, Tondabayashi, Japan

[73] Assignee: Sanyo Electric Co., Ltd., Moriguchi, Japan

[21] Appl. No.: 08/876,905

[22] Filed: Jun. 16, 1997

Related U.S. Application Data

[63] Continuation of application No. 08/503,195, Jul. 17, 1995, abandoned, which is a continuation of application No. 08/208,587, Mar. 11, 1994, abandoned.

[30] Foreign Application Priority Data

Mar. 11, 1993 [JP] Japan ........................................ 5-50677
Jun. 30, 1993 [JP] Japan ....................................... 5-161935

[51] Int. Cl.⁶ .............................. G11B 15/46; G11B 5/09
[52] U.S. Cl. ........................................ 360/73.01; 360/51
[58] Field of Search .............................. 360/10.3, 39, 46, 360/60, 73.01, 75, 77.03, 51; 250/548; 364/158; 318/569, 608, 611; 348/211; 356/350; 388/800

[56] References Cited

U.S. PATENT DOCUMENTS

| | | | |
|---|---|---|---|
| 4,668,900 | 5/1987 | Tabuchi | 318/608 |
| 4,849,835 | 7/1989 | Entezarmandi et al. | 360/60 |
| 4,885,793 | 12/1989 | Tabuchi | 360/73.01 X |
| 4,954,905 | 9/1990 | Wakabashi et al. | 360/77.03 |
| 5,181,078 | 1/1993 | Lefevre et al. | 356/350 |
| 5,220,466 | 6/1993 | Coker et al. | 360/39 X |
| 5,313,343 | 5/1994 | Yatomi | 360/71 |
| 5,391,969 | 2/1995 | Tabuchi | 318/611 |

*Primary Examiner*—W. Chris Kim
*Attorney, Agent, or Firm*—Armstrong, Westerman, Hattori, McLeland & Naughton

[57] ABSTRACT

A digital servo system is provided for controlling a cylinder motor in a video tape recorder. The servo system includes a servo loop and a digital filter inserted in the servo loop. The digital filter includes a coefficient multiplying circuit for multiplying a coefficient. A coefficient changing circuit is further provided for changing the coefficient of the coefficient multiplying circuit. The digital filter is provided to improve the servo gain at a low frequency region. This avoids lag caused by the filter in this region, and advantageously provides resistance to disturbances.

4 Claims, 7 Drawing Sheets

F I G. 3
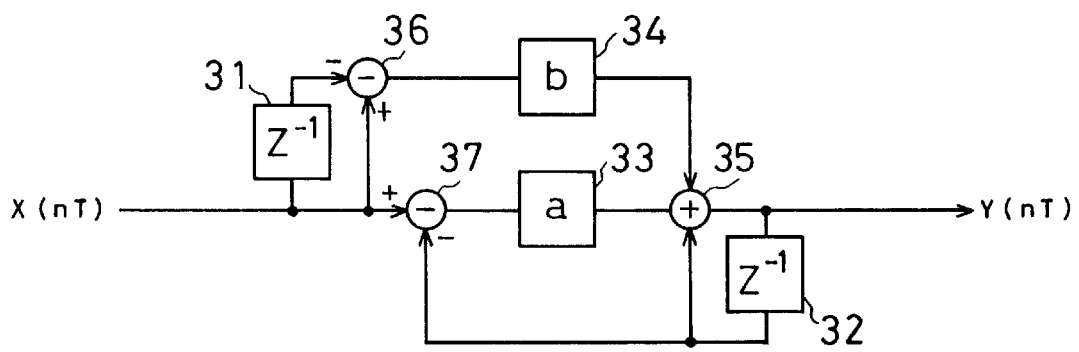
F I G. 4
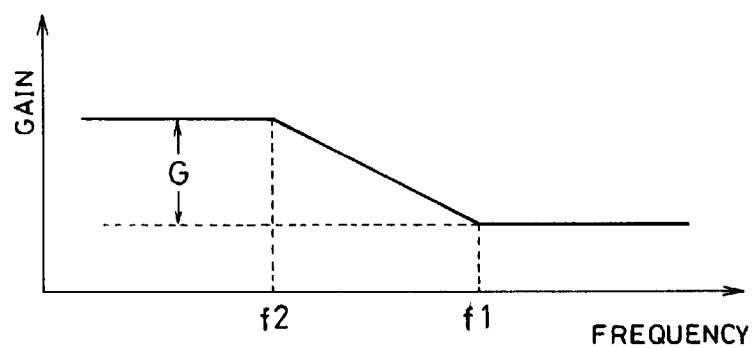

DIGITAL SERVO SYSTEM HAVING A SERVO LOOP, A DIGITAL FILTER INCLUDING COEFFICIENT MULTIPLYING MEANS, AND COEFFICIENT CHANGING MEANS

This application is a continuation of application Ser. No. 08/503,195, filed Jul. 17, 1995, now abandoned, which is a continuation of application Ser. No. 08/208,587, filed Mar. 11, 1994, abandoned.

BACKGROUND OF THE INVENTION

1. Field of the Invention

The present invention relates to a digital servo system. More specifically, the present invention relates to a digital servo system which is provided with a digital filter in a servo loop, and a video tape recorder utilizing such a digital servo system.

2. Description of the Related Art

A digital servo system is used for control of a cylinder motor used in a video tape recorder, for example. In the prior art, in order to provide a high servo gain at a low frequency region in a normal state, in general, a digital filter is inserted in a servo loop as a lag filter.

If the digital filter is inserted in the servo loop, the servo gain at the low frequency region in the normal stage is caused to be at a high level and thus stability increases; however, there occurs a problem of a phase pull-in time at a start of rotation, that is, a step response, is increased.

In order to solve such a problem, a technique is used wherein the digital filter is not inserted in the servo loop at the start of rotation, but is inserted after the rotation approaches the normal state. However, in such a case, there is a further problem in that a discontinuity occurs in a phase error signal, and thus a discontinuity arises in a control signal by which the rotation of the rotation body is controlled, both before and after the insertion of the filter. Therefore, a variation or fluctuation occurs in the rotation of the motor.

Furthermore, a digital filter has been considered having a dynamic range by which the step response and the resistance for the disturbance can be respectively comprised. However, in such a case, there is a further problem in that it is impossible to fully utilize the digital filter as a lag filter.

SUMMARY OF THE INVENTION

Therefore, a principal object of the present invention is to provide a novel digital servo system.

Another object of the present invention is to provide a digital servo system in which a phase pull-in time at a start of rotation is short and resistance to disturbance in a normal state is strong.

Another object of the present invention is to provide a video tape recorder in which such a novel digital servo system is utilized.

A digital servo system according to the present invention comprises: a servo loop; a digital filter inserted in the servo loop, the digital filter including delay means, coefficient multiplying means, and one of adding means and subtracting means, in accordance with a difference equation; and coefficient changing means for gradually changing the coefficient of the coefficient multiplying means.

In an aspect of the present invention, the digital servo system further comprises phase-lock detecting means for detecting a phase-locked condition during rotation of the rotation body, and the coefficient changing means changes the coefficient when the phase-lock is continuously detected for a predetermined time period such that the dynamic range of the digital filter is made gradually larger.

In the above described servo system, a transfer characteristic of the digital filter is changed by changing the coefficient. Accordingly, it becomes possible to insert the digital filter with little influence on the servo system. Especially, if the transfer characteristic is maintained flat until the rotation of the rotation body is locked in phase and thereafter the dynamic range of the digital filter is made larger, it is possible to optimize the step response in the normal state and the time required for locking the servo system, respectively, and it is possible to minimize unevenness or fluctuation of the rotation due to the discontinuity of the control signal.

The above described objects and the other objects, features, aspects and advantages of the present invention will become apparent from the following detailed description of the present invention when taken in conjunction with the accompanying drawings.

BRIEF DESCRIPTION OF THE DRAWINGS

FIG. 3 is a functional block diagram showing a major portion of the embodiment;

FIG. 4 is a graph showing an operation of the embodiment;

DETAILED DESCRIPTION OF THE PREFERRED EMBODIMENTS

Figure 1:
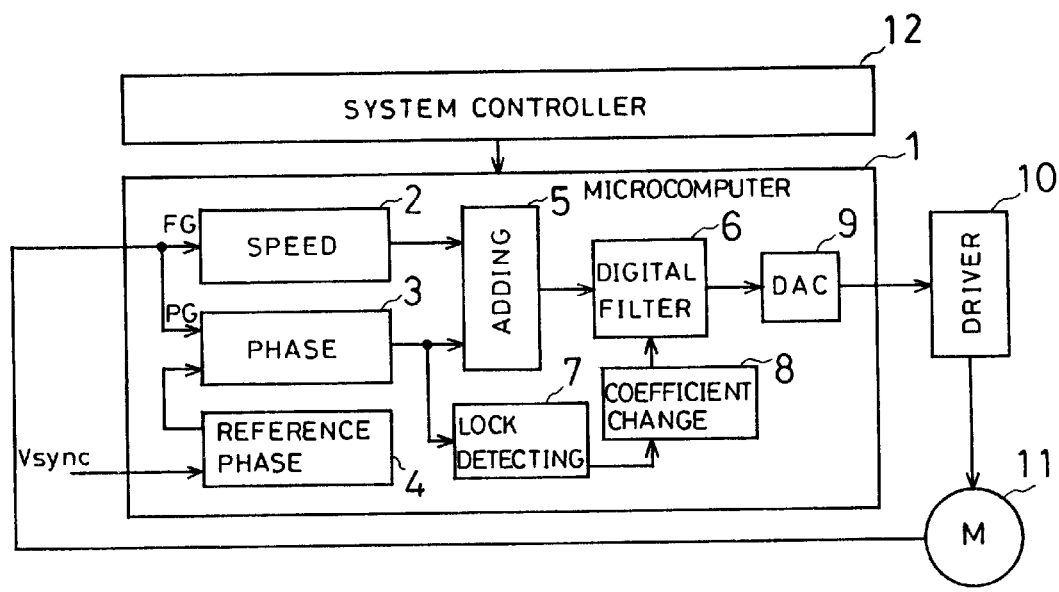
FIG. 1 is a functional block diagram showing one embodiment according to the present invention.

Referring to FIG. 1, a digital servo system of a preferred embodiment includes a microcomputer 1 for performing the functions of a speed error signal producing unit 2, a phase error signal producing unit 3, a reference phase signal producing unit 4, an adding unit 5, a digital filter unit 6, a phase-lock detecting unit 7, and a coefficient changing unit 8, respectively, in a software manner in accordance with a program. A DAC (Digital to Analog Converter) 9 is provided as a hardware component within the microcomputer 1. A driving signal from the DAC 9 is applied to a driver 10 which drives a cylinder motor 11 of a video tape recorder. In addition, the microcomputer 1 is managed or controlled by a system controller 12 which may also be a microcomputer.

An operation of the above embodiment will be described with reference to FIGS. 7 to 12 in the following description.

Figure 7:
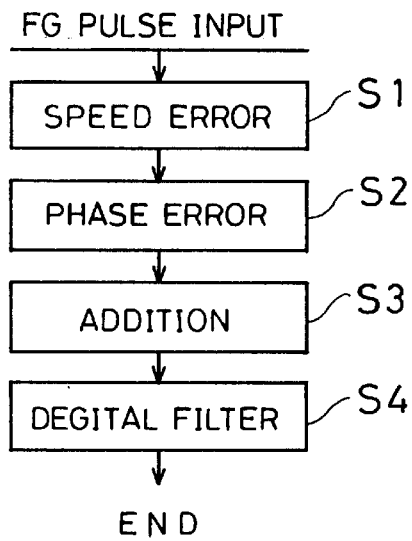
FIG. 7 is a flowchart showing an operation of the embodiment.

FIG. 7 shows an overview of the operation as a whole. When an FG pulse which is generated according to the rotation of the cylinder motor 11 is inputted to the microcomputer 1, the speed error signal producing unit 2 produces a speed error signal by counting a time interval of the FG pulse (S1). Then, the phase error signal producing unit 3 produces a phase error signal on the basis of a PG pulse which is generated according to the rotation of the cylinder motor 11 and represents a rotation phase of the cylinder motor 11, and a reference phase signal is produced by the reference phase signal producing unit 4. That is, the phase error signal is produced by comparing the PG pulse and the reference phase signal with each other by the phase error signal producing unit 3 (S2). In addition, the reference phase signal producing unit 4 produces the reference phase signal by multiplying a vertical synchronization signal (Vsync) which is inputted from an external source when a recording mode is instructed by the system controller 12 of the video tape recorder, and the reference phase signal is inputted by utilizing an internal counter (not shown) when a reproducing or play mode is instructed by the system controller 12.

Then, the speed error signal and the phase error signal are added to each other with a predetermined ratio by the adding unit 5 (S3) so as to be inputted to the digital filter unit 6. The digital filter unit 6 functions as a lag filter which provides a larger servo gain at a low frequency region so that the resistance to the disturbance can be strengthened (S4).

Figure 8:
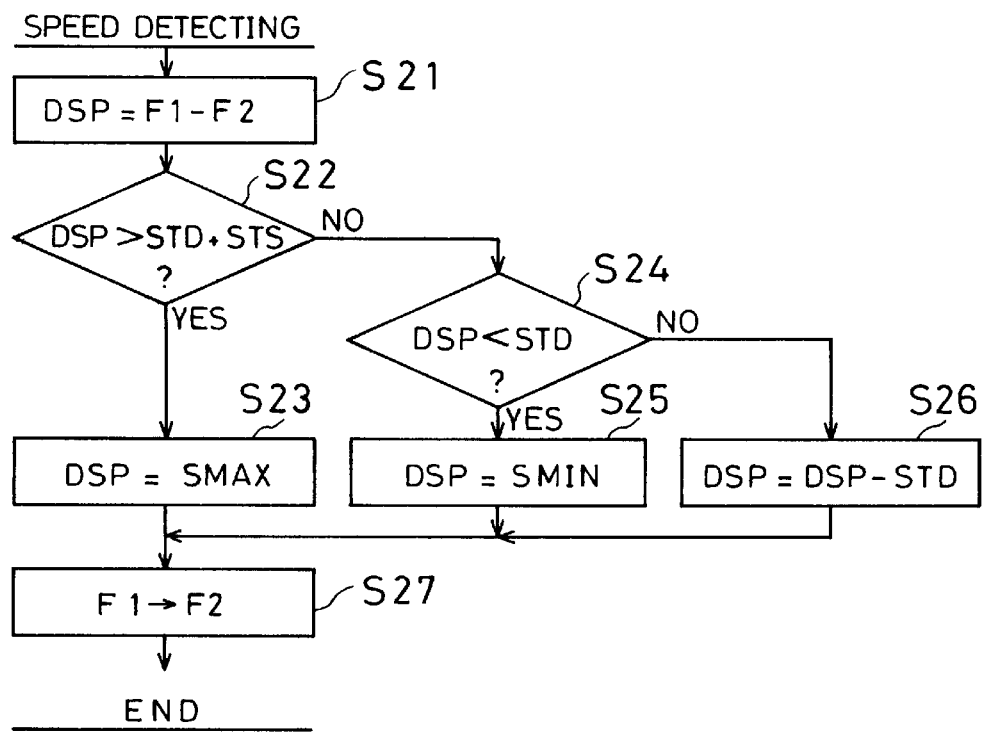
FIG. 8 is another flowchart showing an operation of the embodiment.
Figure 9:
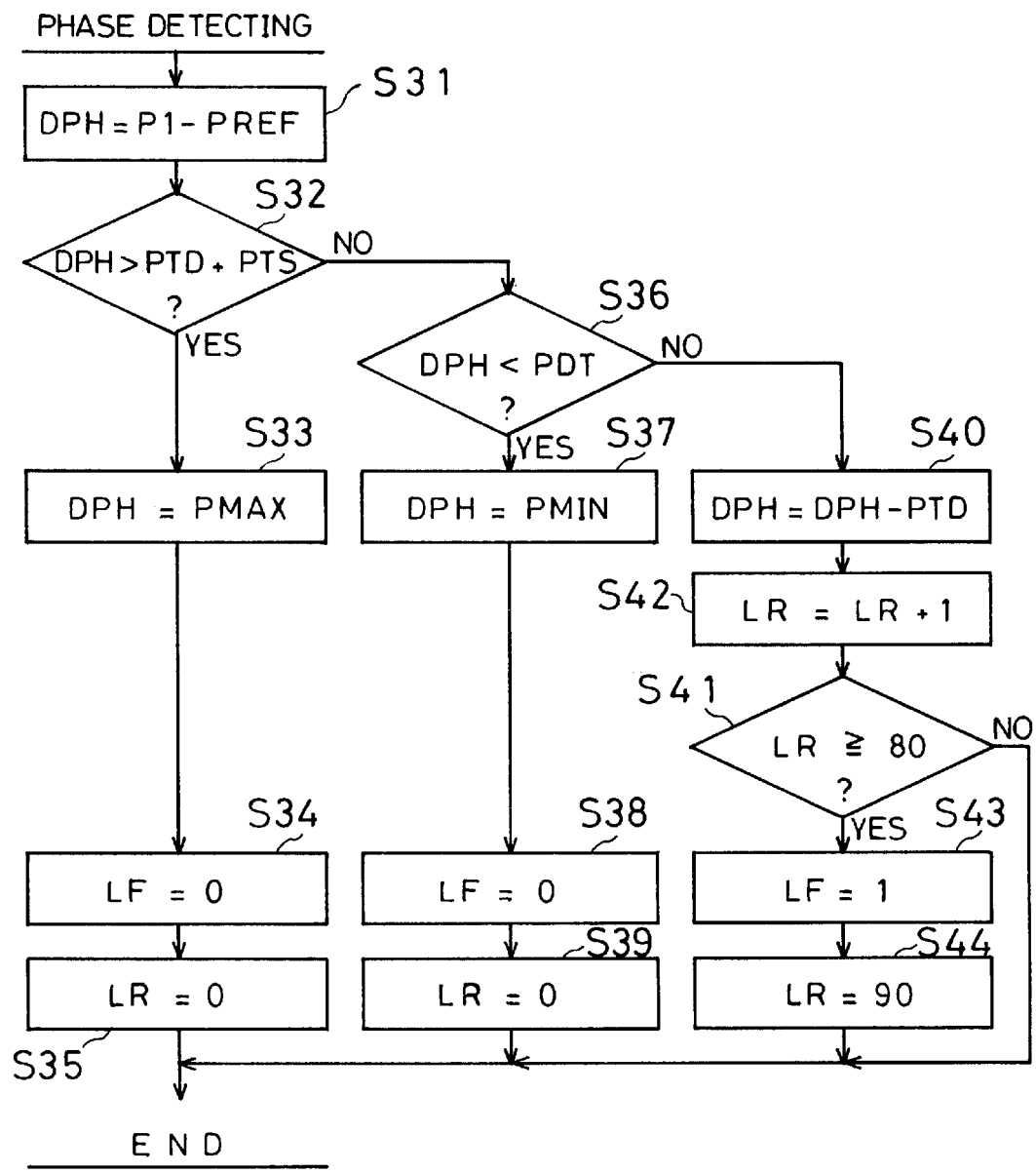
FIG. 9 is a further flowchart showing an operation of the embodiment.

Operation of the speed error signal producing unit 2 is shown in FIG. 8. When the FG pulse is inputted to the microcomputer 1, a value of reference counter (not shown) which counts a reference clock is read as a value F1. Then, a difference is calculated between the value F1 and a value F2 which has been read in response to a former FG pulse, so as to output a difference value DSP (S21). Then, the value DSP is compared with the sum STD+STS (S22). If the value DSP is larger than the sum STD+STS, the value DSP is substituted with a value SMAX which is a maximum value of the speed error signal (S23). In addition, the term STS means a changing width of the speed error signal. On the other hand, if the value DSP is less than the value STD, the value DSP is replaced with a value SMIN which is a minimum value of the speed error signal (S24, S25). The value F1 is replaced with the value F2, thereby preparing for a next FG pulse input (S27).

In addition, if the value DSP is smaller than the sum STD+STS but larger than the value STD, the value DSP is substituted with a difference value DSP−STD (S26).

Next, operation of the phase error signal producing unit 3 and the phase-lock detecting unit 7 will be described. The PG pulse is generated for each rotation of the cylinder motor 11, representing a rotation phase of the cylinder motor 11. When such a PG pulse is inputted to the microcomputer 1, the phase error signal producing unit 3 reads a value of the reference counter as a value P1 and then subtracts a reference phase data PREF from the value P1, so as to output a value DPH (S31). In addition, PREF means a value of the reference counter at a time when the phase reference signal is applied from the phase reference signal producing unit 4. Then, the value DPH is compared with a value PTD+PTS (S32). In addition, the term PTD means a bias value of the phase error signal, and the term PTS means a changing width of the phase error signal. If the value DPH is larger than the value PTD+PTS, the value PDH is replaced with a value PMAS that is a maximum value of the phase error signal. If the digital filter unit 6 is to be used in a subsequent stage, "1" is set in a flag LF, and the flag LF is set to be "0" when the digital filter unit 6 is not to be used in the subsequent stage (S34), and "0" is set in a counter LR which counts a time period during which a phase-locked state continues (S35). If the value DPH is less than the value PTD, the value PDH is replaced with a value PMIN that is a minimum value of the phase error signal (S36, S37). Then "0" is set in the flag LF, and "0" is set in the time counter LR (S39). If the value DPH is greater than the value PTD but less than the sum PTD+PTS, the value PDH is replaced with a difference value DPH−PTD (s32, S36, S40), and a counting value of the counter LR is incremented by 1 (S41). Then, it is detected by the phase-lock detecting unit 7 whether or not the value of the counter exceeds "80", for example (S42). If the value of the counter LR becomes greater than "80", that is, if it is detected that the phase-lock state is continued for a predetermined time period, "1" is set in the flag LF (S43), and "90" is set in the counter LR (S44).

Figure 10:
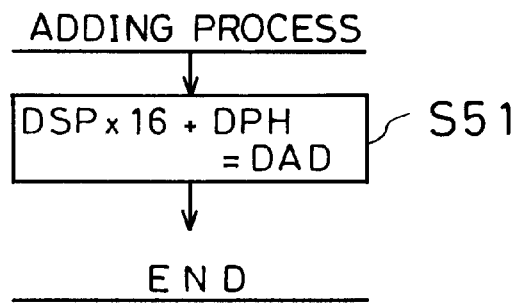
FIG. 10 is still another flowchart showing an operation of the embodiment.

Next, an operation of the adding unit 5 will be described with reference to FIG. 10. The speed error signal DSP produced by the speed error signal producing unit 2 and the phase error signal DPH are added to each other in a ratio of 16:1, and the added result becomes a value DAD (S51).

Figure 11:
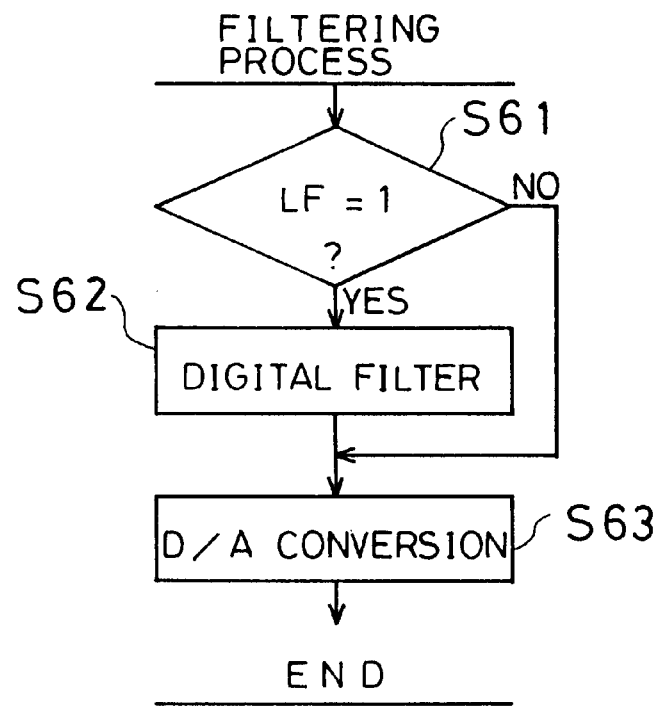
FIG. 11 is another flowchart showing an operation of the embodiment.

Operation of the digital filter unit 6 and the DAC 9 will be described with reference to FIG. 11. If the value of the flag LF is "1", the DAC 9 converts the value DAD which has been processed by the digital filter unit 6 into an analog signal; however, "0" is set in the flag LF, and the value DAD is converted into an analog signal (S61, S62, S63).

Figure 2:
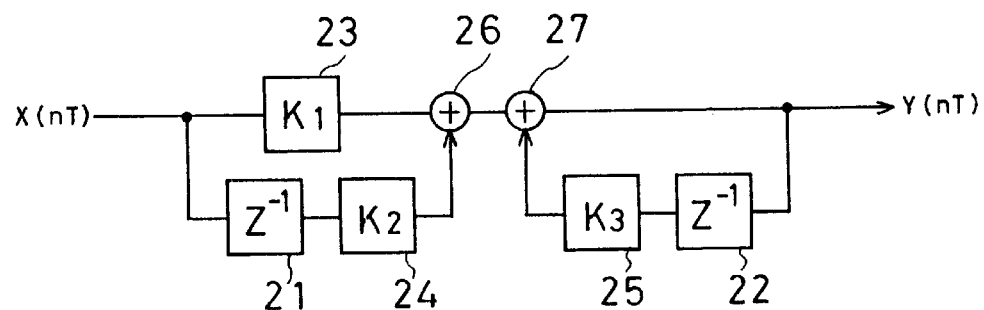
FIG. 2 is a functional block diagram showing an operation of the embodiment.

In the following, a detailed operation of the digital filter unit 6 and the coefficient changing unit 8 will be described. As shown in FIG. 2, the digital filter unit 6 includes a delay unit which is constructed of functional components 21 and 22, a coefficient multiplying unit which is constructed of functional components 23, 24 and 25, and an adding unit which is constructed of functional components 26 and 27, in accordance with a difference equation. In FIG. 2, the reference symbol X denotes an input signal, the reference symbol Y denotes an output signal, and the reference symbol T denotes a sampling period. In addition, (nt) indicates a value or data at a given time, and (Nt−T) indicates a value or data which is delayed with respect to the data (nT) by the sampling period T. The delay unit delays the signal by the sampling period T.

The difference equation can be represented by the following equation (1).

$$Y(nT)=K_3Y(nT-T)+K_1X(nT)+K_2X(nT-T) \qquad (1)$$

The equation (1) can be modified as represented by the following equation (2).

$$Y(nT)=Y(nT-T)+a[X(nT)-Y(nT-T)]-b[X(nT)-X(nT-T)] \qquad (2)$$

Therefore, the functional block diagram in FIG. 2 can be modified as shown in FIG. 3. That is, the delay unit includes functional components 31 and 32, the coefficient multiplying unit includes functional components 33 and 34, the adding unit includes a functional component 35, and the subtracting unit includes functional components 36 and 37. In addition, a transfer or frequency characteristic of the digital filter unit 6 can be represented as shown in FIG. 4.

Then, frequencies $f_1$ and $f_1$, and a gain ration G can be represented by the following equations (3), (4), and (5).

$$f_1 = \frac{a}{\pi(2b+a)T} \quad (3)$$

$$f_2 = \frac{a}{\pi(2-a)T} \quad (4)$$

$$G = \frac{2-a}{2b+a} = \frac{1}{b}(b \gg a) \quad (5)$$

In addition, "a" and "b" in the equations (3)–(5) are the same as "a" and "b" of the aforementioned equation (2). Furthermore, since the relationship of a>>b is, in general, obtained in a lag filter which is used in the servo system, the equation (5) can normally be satisfied.

Figure 5:
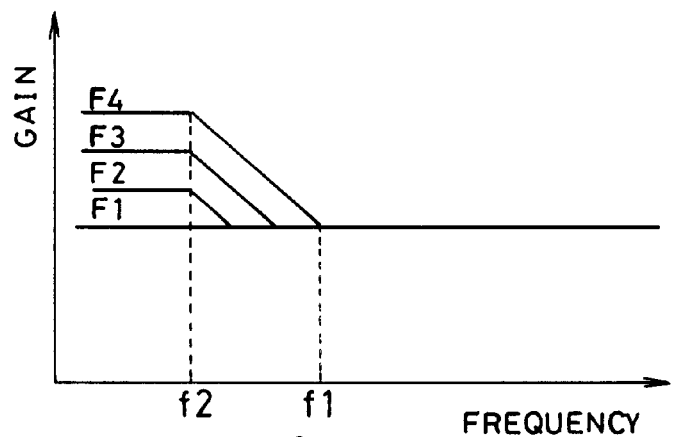
FIG. 5 is a graph showing an operation of the embodiment, in which only one coefficient can be changed.
Figure 6:
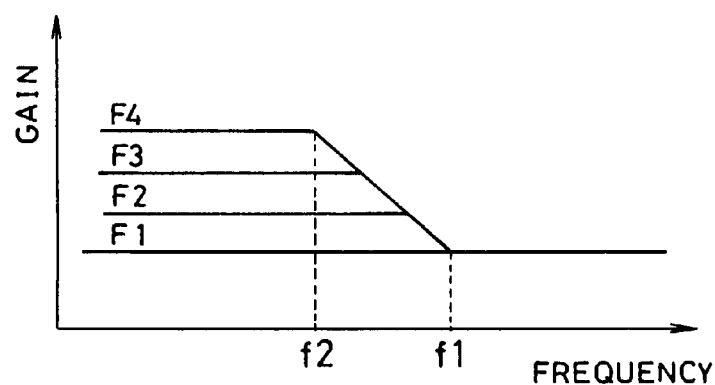
FIG. 6 is a graph showing an operation of the embodiment, in which both coefficients can be changed.

If the value of the coefficient "a" is fixed and the value of the coefficient "b" is changed in the equation (2), the transfer characteristic of the digital filter unit 6 is changed as shown in FIG. 5. If in equation (s) the values of the coefficients "a" and "b" are both varied, as shown in FIG. 6, the transfer characteristics of the digital filter unit 6 are changed as shown in FIG. 6. Therefore, either a type of the digital filter unit of FIG. 5 or a type of the digital filter unit of FIG. 6 may be selected in accordance with conditions required for respective servo systems. However, in order to make the gain of the servo system gradually higher after the phase-locked state continues for the predetermined time period, the type of FIG. 5 is preferable. In addition, the above described digital filter unit is provided in a software, and therefore, repetition of the operation of N times is equal to a series connection of the digital filter units of N, and therefore, the resistance to the disturbance can be strengthened.

With reference to FIG. 1, if a command for starting the rotation of the cylinder motor 11 is applied to the microcomputer 1 from the system controller 12, the cylinder motor 11 starts rotation. If the transfer characteristic of the digital filter unit 6 is flat, as shown by F1 in FIG. 12, at a time of the start of rotation of the cylinder motor 11, a time until the phase is locked becomes very short. In addition, similarly, to FIG. 5 and FIG. 6, an ordinate of FIG. 12 indicates a gain and an abscissa of FIG. 12 indicates a sampling frequency.

Figure 12:
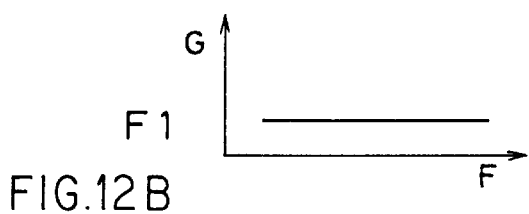
FIG. 12 is a graph showing an operation of the embodiment.
Figure 12:
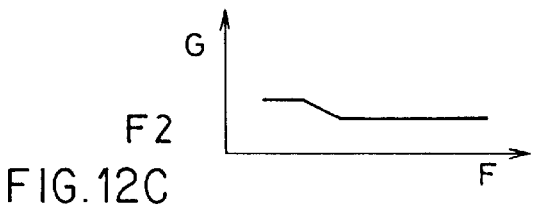
Figure 12:
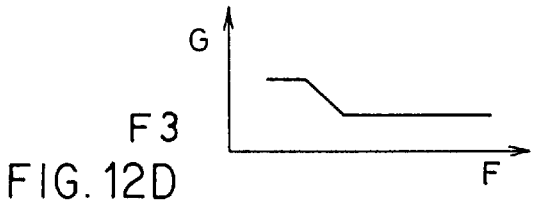
Figure 12:
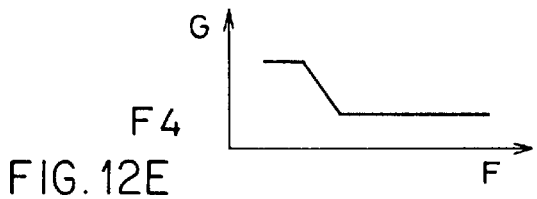
Figure 12:
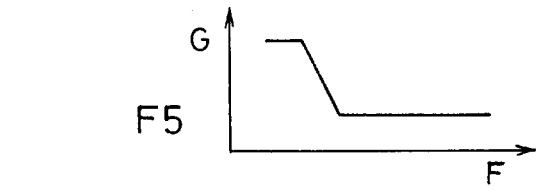
Figure 12:
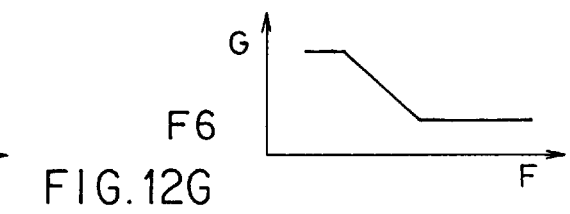
Figure 12:
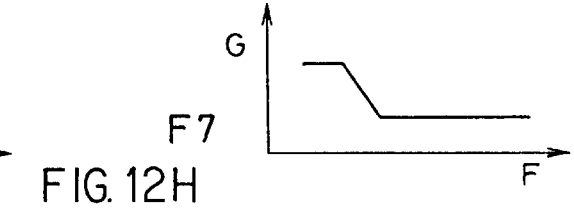
Figure 12:
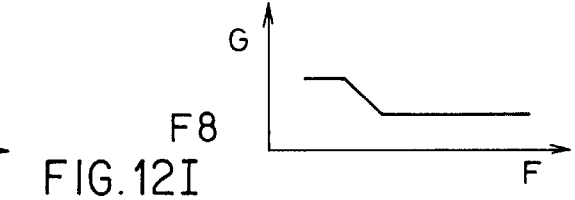
Figure 12:
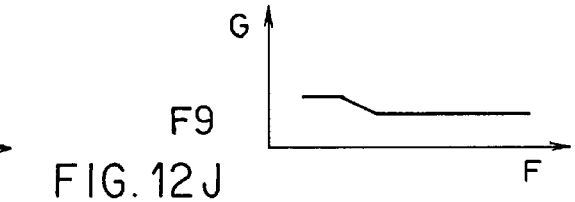
Figure 12:
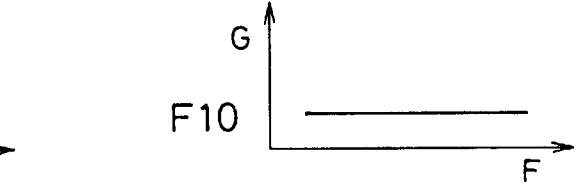

After the continuity of the phase-locked state is detected by the phase-lock detecting unit 7, if the value of the coefficient "b" is made gradually smaller by the coefficient changing unit 8, the transfer characteristic of the digital filter unit 6 can be changed to F2, F3, F4 and F5 in FIG. 12. More specifically, as the gain at a low frequency region is gradually made larger from F2 to F5, the resistance to the disturbance is made gradually stronger.

In a case where the change of the transfer characteristic of the digital filter unit 6 is made at four stages as in the embodiment shown in FIG. 12, a degree of the discontinuity of the control signal due to the discontinuity of the transfer characteristic becomes ¼ in comparison with a case where a digital filter having a transfer characteristic of F5 shown in FIG. 13 is suddenly inserted in the servo loop. Therefore, it is possible to insert the digital filter very smoothly.

If the number of the stages at which the transfer characteristic of the digital filter 6 is changed is increased, the continuity of the control signal can be further improved. This is also applicable to the type of filter unit of FIG. 6.

In addition, in a case where it is detected by the phase-lock detecting unit 7 that the continuity of the phase-locked state is broken, that is, a phase-unlock detecting unit detects that the phase becomes an unlocked state, the discontinuity of the phase error signal can be avoided by changing the transfer characteristic of the digital filter unit 6 to F6, F7, F8, F9, and F10 as shown in FIG. 12. In contrast, if the digital filter having the transfer characteristic of F6 is suddenly disconnected from the servo loop, the discontinuity of the phase error signal and thus the control signal becomes large; however, according to the embodiment, such a problem can be solved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital servo system for controlling a rotatable body, comprising:

a servo loop;

a digital filter including a delay means for delaying signal data with a delay time associated with a sampling period, a first addition and/or subtraction means for receiving an output of the delay means, a first coefficient multiplying means for multiplying an output of the first addition and/or subtraction means by a first coefficient, a second addition and/or subtraction means for receiving said signal data, and a second coefficient multiplying means for multiplying an output of the second addition and/or subtraction means by a second coefficient;

coefficient changing means for changing at least one of the first and second coefficients to improve servo gain at a low frequency region of rotation of the rotatable body; and a phase-lock detecting means for detecting a phase-locked state of the rotatable body, wherein said coefficient changing means changes at least one of the first and second coefficients in response to a detection by the phase-detecting means.

2. A digital servo system according to claim 1, further comprising phase-unlock detecting means for detecting whether a phase-locked state of the rotatable body is broken, wherein said coefficient changing means changes the first and second coefficients in response to a detection by the phase-unlock detecting means.

3. A video tape recorder which includes a motor to be controlled by a digital servo system, comprising:

a servo loop for controlling the motor;

a digital filter including a delay means for delaying signal data with a delay time associated with a sampling period, a first addition and/or subtraction means for receiving an output of the delay means, a first coefficient multiplying means for multiplying an output of the first addition and/or subtraction means by a first coefficient, and second addition and/or subtraction means for receiving said signal data, and a second coefficient multiplying means for multiplying an output of the second addition and/or subtraction means by a second coefficient;

coefficient changing means for changing at least one of the first and second coefficients to improve servo gain at a low frequency region of rotation of the motor; and a phase-lock detecting means for detecting a phase-locked state of the motor, wherein said coefficient changing means changes at least one of the first and second coefficients in response to a detection by the phase-detecting means.

4. A digital servo system according to claim 3, further comprising phase-unlock detecting means for detecting whether a phase-locked state of the motor is broken, wherein said coefficient changing means changes at least one of the first and second coefficients in response to a detection by the phase-unlock detecting means.

* * * * *